Patented Feb. 6, 1923.

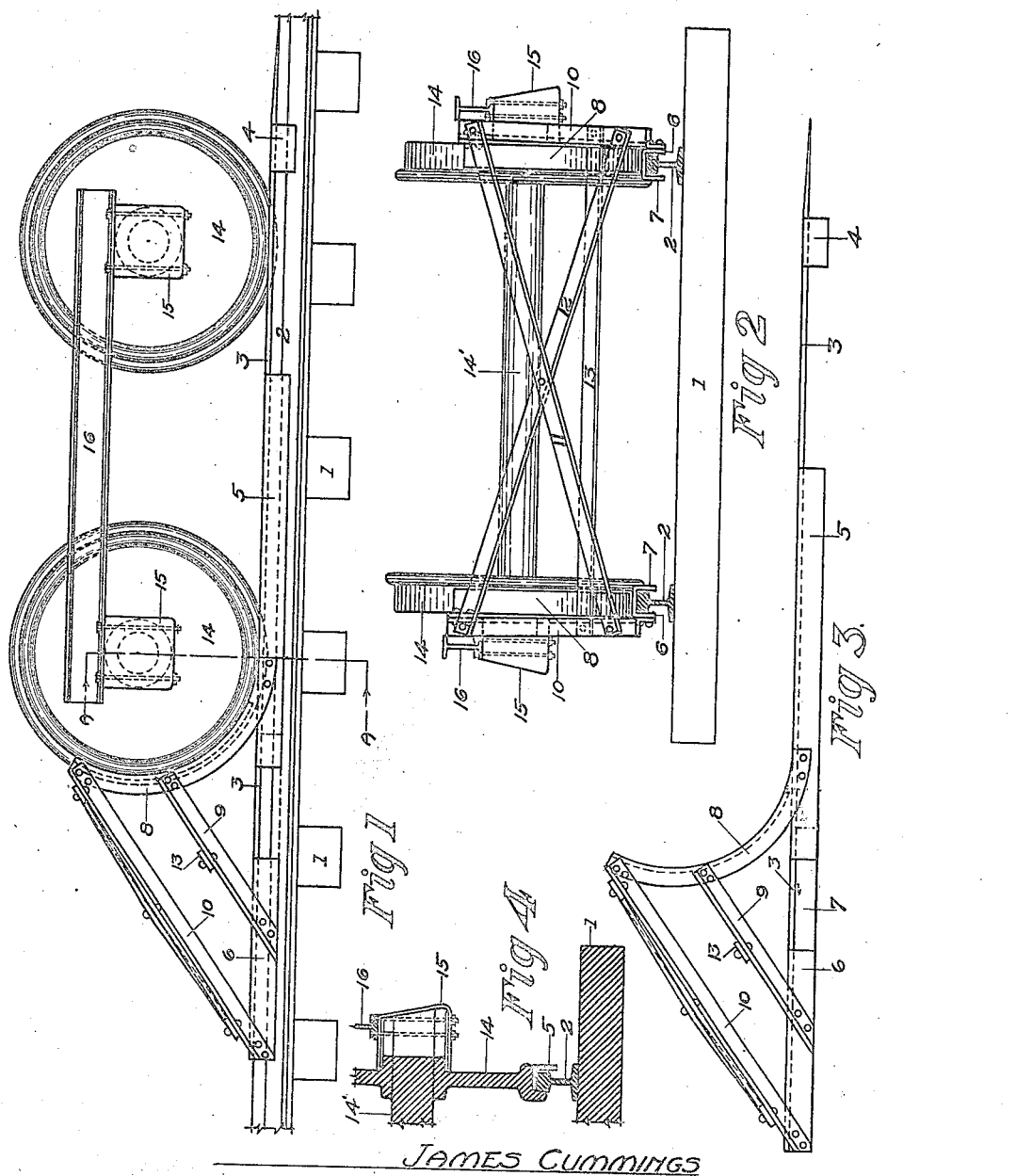

1,444,169

UNITED STATES PATENT OFFICE.

JAMES CUMMINGS, OF WILSONBURG, WEST VIRGINIA.

DETACHABLE CAR STOP FOR SIDE TRACKS.

Application filed January 19, 1922. Serial No. 530,309.

*To all whom it may concern:*

Be it known that I, JAMES CUMMINGS, citizen of the United States, residing at Wilsonburg, in the county of Harrison and State of West Virginia, have invented certain new and useful Improvements in Detachable Car Stops for Side Tracks, of which the following is a full specification.

This invention comprehends new and useful improvements in car stops, for railroad side tracks, as shown and described in the accompanying drawings.

The main object of this invention is the production of a detachable car stop, adapted to be placed upon the rails of railroad side tracks, and to engage the car truck wheels and stop a moving car, by means of the weight of the car resting upon the track portion of the stop, and the truck wheels engaging the curved part thereof.

A further object of this invention is the construction of a detachable car stop adapted to engage and stop moving cars, by means of friction between the track rails and the stopping device, without the necessity of rigidly attaching said stop to the railroad bed or track rails, thereby rendering my improved car stop more efficient and commercially desirable.

With the above and other objects in view, as will more fully appear as the description proceeds, it will be observed that my invention consists of certain novel construction and combination of parts, as hereinafter fully described, illustrated and claimed; but it is to be understood that several changes may be made in the construction of my car stop, without departing from the spirit and intent thereof; and I attain these objects by means of certain construction and mechanism illustrated by the accompanying drawings, in which:

Figure 1— represents a side elevation of a railroad track, my detachable car stop and a car truck, as they engage each other when in practical use.

Figure 2— represents the rear end elevation of my car stop, resting upon the track rails and engaging the car truck wheels.

Figure 3— represents a side elevation of the car stop, removed from the track and car truck.

Figure 4— represents a cross section of a rail and a portion of a truck wheel, along the dotted line A—A.

Referring to the drawings, similar numerals refer to similar parts throughout the several views.

Numeral 1— designates the usual railroad ties in the construction of railroad beds; numeral 2— designates the track rails; numeral 3— designates the flat tread member of my car stop, adapted to rest upon the tread portion of the track rail, and upon which the car truck wheels rest, when engaging the car stop; 4— designates a guide flange on the outer side of the front end of the tread portion of my car stop; 5— designates a central, outer flange, forming a part of the car stop; 6— designates the rear, outer flange, and 7 designates the rear inner short flange of the said car stop; 8— designates the upward extending curved member portion of my car stop, rigidly attached to the central flange 5 and the tread portion of the stop 3, adapted to engage the tread part of the car truck wheels; 9 and 10— designate braces the upper ends of which are rigidly attached to the curved portion of the car stop, and the lower ends rigidly attached to the rear, outer flange of the tread portion of said car stop; 11— 12 and 13 designate cross braces rigidly attached to each rail car stop, as shown in Figures 1 and 2; 14— designates car wheels; 14'— designates the car axle; 15— designates the journal boxes on the outer end of the car axles; 16— designates a channel bar, attached, by means of bolts, to the journal boxes —15.

From the foregoing description and reference to Figures 1 and 2, which illustrate the position of my car stop, while resting upon the track rails and engaging the car truck, showing all the truck wheels resting upon the tread portion, and one wheel, on each side, engaging the upper extending curved stop portion of my improved, detachable car stop.

In applying my improved, detachable car stop, it will be observed that the tread member portion is adapted to rest upon both the track rails, and extend a sufficient distance upon the track rails to receive upon the upper surface of said member all of the wheels of one car truck, the said tread members having guide flanges, extending downward on each side of the track rails, as shown in Figure 2.

It will be observed further, that, in the use of my car stop, it can be placed upon railroad switches or side tracks, at the point where cars should be stopped; and no means need be employed to fasten my car stop to the track. When a car is approaching the stop, the forward truck passes upon the tread member portion of my stop; and the entire weight of this end of the car rests upon the tread member of the car stop, thus creating great friction between the track rail and the under surface of the car stop; and the forward wheels come in contact with and engage the upward curved portion of the car stop. Should the car approach and enter upon this car stop, at a slow speed, the car will be caused to stop almost instantly; and, in the event of the car approaching and entering upon the tread portion of my car stop, at a greater speed, the force of the car in motion, will cause this detachable car stop to slide a short distance upon the rails, and then stop. By this means it will be observed that the usual strain on car trucks and tracks, by the sudden stopping of a car, is wholly eliminated.

While the accompanying drawings fully illustrate the preferable embodiments of my invention, it is not limited thereto, but various changes may be made in the construction and arrangement of the parts, without departing from the scope and spirit of said invention, as more fully defined in the appending claim.

Having described my invention, what I claim as new and desire to secure by Letters Patent is:

A detachable car stop of the character described, consisting of two tread members, adapted to rest upon the tread portion of the track rails, having inner and outer guide flanges, extending downward, on each side of the track rails; two curved truck wheel stops, rigidly attached to the outer flanges and tread members, and extending upward therefrom, adapted to engage the truck wheels; a plurality of side braces, rigidly attached to the tread members and curved portion of the car stop; a plurality of cross braces rigidly attached to the side braces by means of which the two car stop members are rigidly supported, in the proper relation for engaging track rails and truck wheels, substantially as described and for the purpose set forth.

In witness whereof I have affixed my signature in the presence of two witnesses.

JAMES CUMMINGS.

Witnesses:
O. L. McDONALD,
G. H. DUTHIE.